(12) United States Patent
Nakata (10) Patent No.: US 11,856,165 B2
(45) Date of Patent: Dec. 26, 2023

(54) IMAGE READING DEVICE, RECORDING DEVICE, AND CONTROL METHOD FOR IMAGE READING DEVICE

(71) Applicant: SEIKO EPSON CORPORATION, Tokyo (JP)

(72) Inventor: Satoshi Nakata, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/168,929

(22) Filed: Feb. 14, 2023

(65) Prior Publication Data

US 2023/0262180 A1 Aug. 17, 2023

(30) Foreign Application Priority Data

Feb. 17, 2022 (JP) ................. 2022-022709

(51) Int. Cl.
*H04N 1/00* (2006.01)
(52) U.S. Cl.
CPC ................. *H04N 1/00631* (2013.01)
(58) Field of Classification Search
CPC .................................... H04N 1/00631
USPC ....................................... 358/498
See application file for complete search history.

(56) References Cited

U.S. PATENT DOCUMENTS 7,924,481 B2 * 4/2011 Kim ............... H04N 1/00578
399/376
10,897,548 B2 * 1/2021 Kokomoto ........... G06F 3/1204
2006/0110197 A1 5/2006 Nose et al.
2018/0034991 A1 2/2018 Osada
2023/0094383 A1 * 3/2023 Miyagi ............. H04N 1/00602
358/498

FOREIGN PATENT DOCUMENTS

| JP | H08-119519 A | 5/1996 |
|---|---|---|
| JP | 2004-067390 A | 3/2004 |
| JP | 2005-306613 A | 11/2005 |
| JP | 2006-143422 A | 6/2006 |
| JP | 2007-320709 A | 12/2007 |
| JP | 2009-134216 A | 6/2009 |
| JP | 2021-073830 A | 5/2021 |

* cited by examiner

*Primary Examiner* — Allen H Nguyen
(74) *Attorney, Agent, or Firm* — WORKMAN NYDEGGER (57) ABSTRACT

A control portion controls a reading portion and a discharge portion, and when a document is placed in a document placement portion, a transport path transports the document, and the reading portion reads an image of the document. When the discharge portion discharges the document for which reading is completed by the reading portion, a document receiving portion receives the document discharged by the discharge portion. The document receiving portion has a first region that overlaps the document placement portion when seen in a vertical direction, and a second region that does not overlap the document placement portion when seen in the vertical direction, and the discharge portion discharges the document so that at least part of the document is placed on the second region.

16 Claims, 8 Drawing Sheets

IMAGE READING DEVICE, RECORDING DEVICE, AND CONTROL METHOD FOR IMAGE READING DEVICE

The present application is based on, and claims priority from JP Application Serial Number 2022-022709, filed Feb. 17, 2022, the disclosure of which is hereby incorporated by reference herein in its entirety.

BACKGROUND

1. Technical Field

The present disclosure relates to an image reading device, a recording device, and a control method for an image reading device.

2. Related Art

JP-A-2021-73830 discloses an image reading device that serves as both a flat bed scanner and an ADF. In such an image reading device, a document is set on a document placement tray 142 integrated with a document feeder 141 placed on an upper surface of the flat bed scanner. The document is read while being transported, and the document that has been read is discharged under the document placement tray 142.

In other words, the document is transported from the upper side of the document placement tray 142 to the lower side of the document placement tray 142 via a curved transport path.

In a known image reading device, the document is discharged under the document placement tray. Since a large-sized document is not hidden by the document placement tray, a user can easily notice the document, but a small-sized document cannot be checked unless the user consciously looks under the document placement tray. Therefore, there is a problem that it is easy to forget to pick up the small-sized document.

In addition, there is also a device in which a small hole is provided in the document placement tray so that the user can check the presence or absence of a document that is discharged under the document placement tray. However, even with this method, the user has to consciously look through the small hole in order to check the presence or absence of the discharged document, and it is also difficult to determine the presence or absence of a document due to a shadow of the document placement tray. Thus, the effect of preventing forgetting to pick up a document was limited.

The present disclosure makes it easy to check for a document to be discharged under the document placement tray.

SUMMARY

The present disclosure includes a reading portion configured to read an image of a document, a document placement portion on which a document is placed, a discharge portion configured to discharge the document for which reading is completed by the reading portion, a document receiving portion configured to receive the document discharged by the discharge portion, a transport path configured to transport the document from the document placement portion to the document receiving portion via the reading portion, and a control portion configured to control the reading portion and the discharge portion, wherein the document receiving portion has a first region that overlaps the document placement portion when seen in a vertical direction, and a second region that does not overlap the document placement portion when seen in the vertical direction, and the discharge portion discharges the document so that at least part of the document is placed on the second region.

In such a configuration, the control portion controls the reading portion and the discharge portion, and when the document is placed in the document placement portion, the transport path transports the document, and the reading portion reads an image of the document. When the discharge portion discharges the document for which reading is completed by the reading portion, the document receiving portion receives the document discharged by the discharge portion.

The document receiving portion has the first region that overlaps the document placement portion when seen in the vertical direction, and the second region that does not overlap the document placement portion when seen in the vertical direction, and the discharge portion discharges the document so that at least part of the document is placed on the second region.

DESCRIPTION OF EXEMPLARY EMBODIMENTS

First Embodiment

Embodiments of the present disclosure will be described below with reference to the accompanying drawings.

Figure 1:
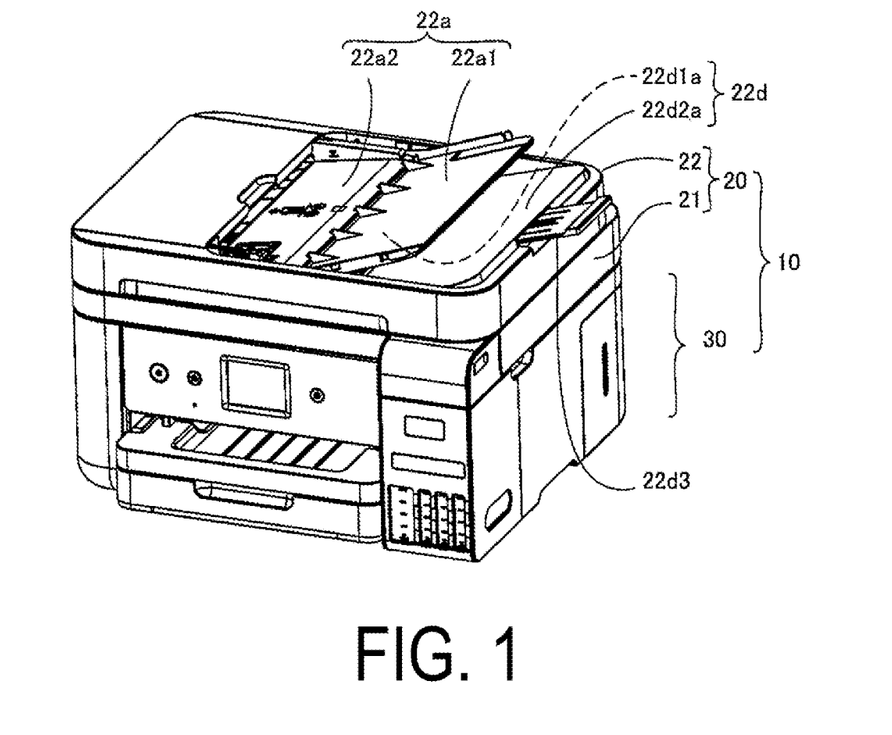
FIG. 1 is a perspective view of a recording device to which an image reading device is applied.
Figure 2:
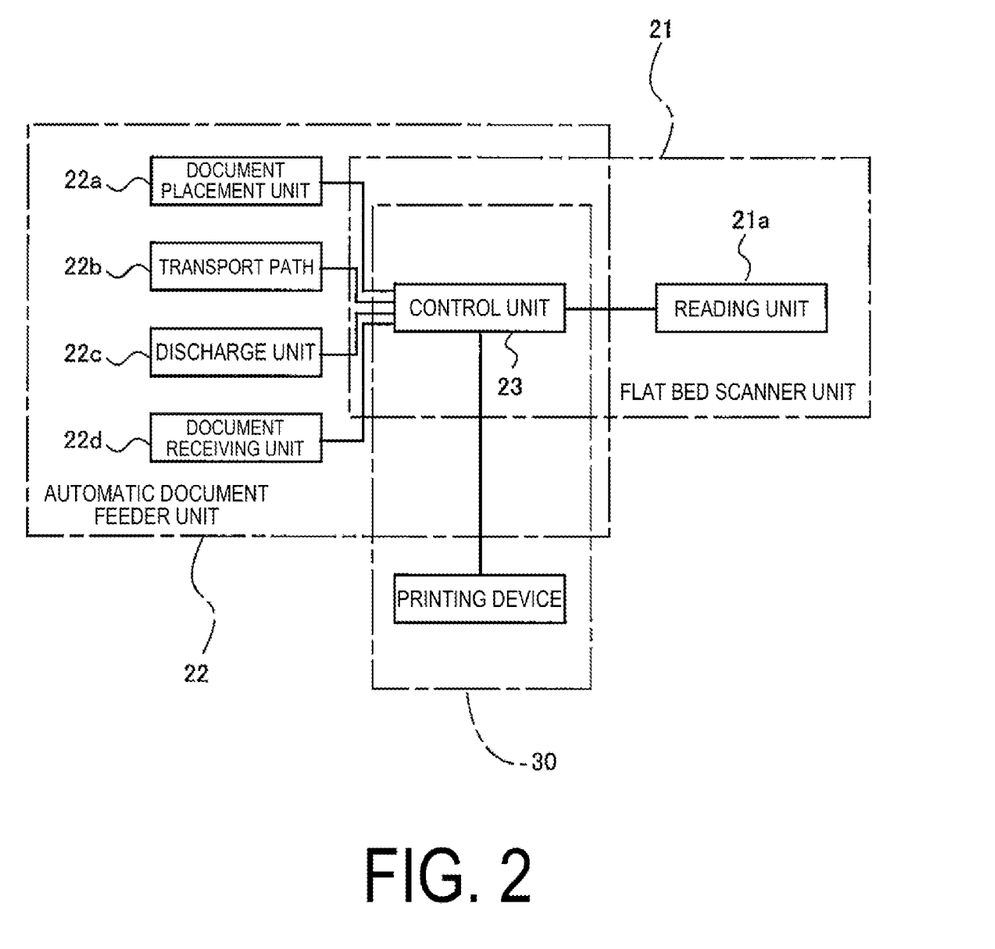
FIG. 2 is a schematic block diagram illustrating the recording device.

FIG. 1 is a perspective view of a recording device to which an image reading device is applied according to an embodiment of the present disclosure, and FIG. 2 is a schematic block diagram of the recording device.

In the drawings, the recording device 10 has an image reading device 20 on the top and an image printing device 30 as a recording unit on the bottom. The image reading device 20 includes a flat bed scanner unit 21 and an automatic document feeder unit 22. The flat bed scanner unit 21 includes transmission glass (not illustrated), and reads an image of a document placed on the transmission glass, or reads the image of the document while the line sensor is stopped and the document is transported facing the line sensor, as the line sensor moves along the transmission glass. The automatic document feeder unit 22 includes a document placement portion 22a on which a document is placed, a transport path 22b through which the document is transported, a discharge portion 22c that discharges the document that has been read, and a document receiving portion 22*d* that receives the document discharged by the discharge portion 22*c* Further, the flat bed scanner unit 21 includes a reading portion 21*a* that reads an image of a document. Although not illustrated, a control portion 23 is provided for controlling constituents (not illustrated) included in the reading portion 21*a*, the discharge portion 22*c*, the document placement portion 22*a*, the transport path 22*b*, the document receiving portion 22*d*, and the like. The control portion 23 includes a processor such as a central processing unit (CPU) (not illustrated). The image printing device 30 corresponds to the recording unit.

The document receiving portion 22*d* includes a first region 22*d*1 that overlaps the document placement portion 22*a* when seen in a vertical direction, and a second region 22*d*2 that does not overlap the document placement portion 22*a* when seen in the vertical direction. Also, the discharge portion 22*c* discharges the document so that at least part of the document is placed in the second region 22*d*2. That is, an amount of discharge of the document by the discharge portion is changed in accordance with a length of the document in a transport direction of the document so that at least part of the document is placed in the second region.

In this way, since the discharge portion 22*c* discharges the document to a region of the document receiving portion 22*d* that does not overlap the document placement portion 22*a*, visibility of the document after reading is completed is improved.

Hereinafter, the configuration thereof will be described in detail.

Figure 3:
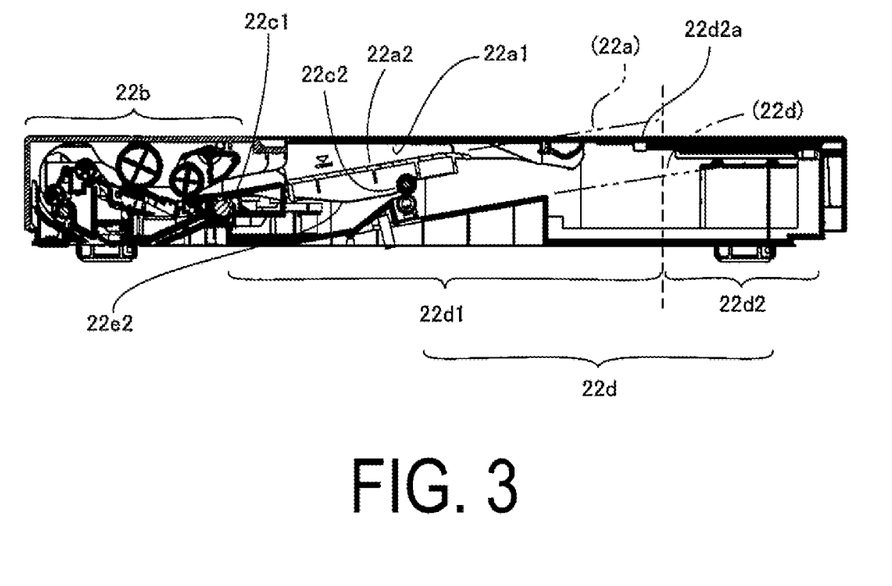
FIG. 3 is a cross-sectional view of an automatic document feeder of the recording device.
Figure 4:
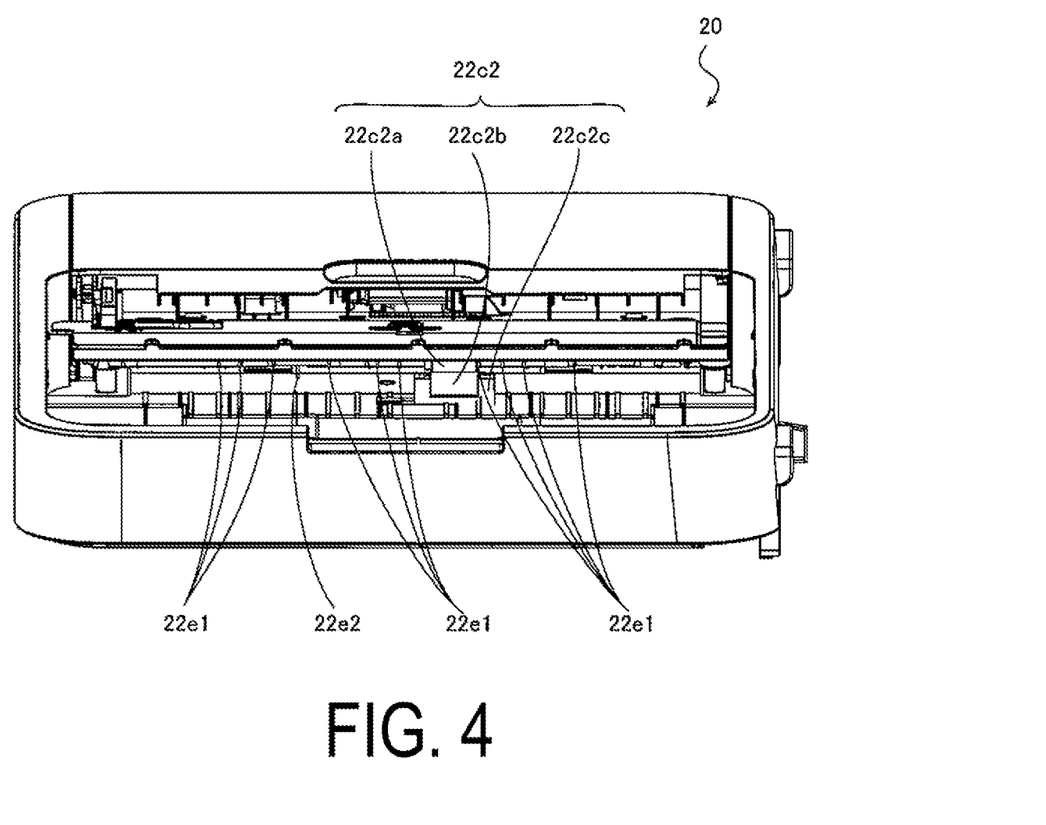
FIG. 4 is a front view seen from the side of the discharge portion of the recording device.

FIG. 3 is a cross-sectional view of the automatic document feeder unit of the recording device, and FIG. 4 is a front view of the recording device when seen from a side surface of the discharge portion.

The automatic document feeder unit 22 has an overall thin box shape. A ceiling plate member 22*a*1 at a central portion of an upper surface is rotatable around a right end portion in FIG. 3 as a rotation axis so that a left end in FIG. 3 is raised upward. The ceiling plate material 22*a*1 can be rotated clockwise up to a rotational angle that is slightly less than approximately 180 degrees in FIG. 3. When the ceiling plate material 22*a*1 rotates clockwise to the maximum in FIG. 3, a back surface of the ceiling plate material 22*a*1 facing the inner side in FIG. 3 becomes part of the document placement portion 22*a*. Before the ceiling plate material 22*a*1 is rotated clockwise, a first inclined surface 22*a*2 is formed on the lower side of the ceiling plate material 22*a*1, and when the ceiling plate material 22*a*1 rotates clockwise to the maximum and is in an inclined state, the ceiling plate material 22*a*1 forms a series of placement surfaces together with the first inclined surface 22*a*2. The entire placement surfaces constitute the document placement portion 22*a*.

However, the configuration of the document placement portion 22*a* is not limited thereto. The ceiling plate material 22*a*1 is not limited to a configuration in which the ceiling plate material 22*a*1 rotates, and may also be configured to be displaced parallel to the first inclined surface 22*a*2, or may be configured to have only the first inclined surface 22*a*2. The document placement portion 22*a* may have a configuration in which the document before reading is appropriately placed.

In a ceiling plate material 22*d*2*a* on the right side of the ceiling plate material 22*a*1 of the central portion, the left end side is moved downward as the ceiling plate material 22*a*1 is rotated clockwise. In other words, in the ceiling plate material 22*d*2*a*, the left end side is rotated counterclockwise with the right end side as a rotation viewpoint and becomes an inclined surface. Additionally, a second inclined surface 22*d*1*a* that forms part of the document receiving portion 22*d* is located below the first inclined surface 22*a*2 that forms the document placement portion 22*a*, and when the left end of the ceiling plate material 22*d*2*a* moves downward and inclines, it forms a series of placement surfaces together with the second inclined surface. The entire placement surfaces constitute the document receiving portion 22*d*.

However, the configuration of the document receiving portion 22*d* is not limited thereto. The ceiling plate material 22*d*2*a* is not limited to a configuration in which the ceiling plate material 22*d*2*a* rotates, and may be configured to be displaced parallel to the second inclined surface 22*ad*1*a*, or may be configured to have only the second inclined surface 22*d*1. Additionally, the document placement portion 22*a* may be fixed in an inclined state. In other words, the document receiving portion 22*d* may have a configuration in which the document that has been read can be placed appropriately.

A plurality of transport rollers is disposed at a portion of the left end side of the automatic document feeder unit 22, guides the document placed on the document placement portion 22*a* leftward from a left end of the document, and further rotates the document by 180 degrees to change an orientation thereof to the right and transports it. That is, the document advances to the left, reverses in a counterclockwise U-shaped path, and passes through a reading region while advancing to the right. Thus, the transport rollers and the like constitute the transport path 22*b*. The reading region faces a transmission glass of the flat bed scanner unit 21 on which the automatic document feeder unit 22 is placed, and in the flat bed scanner unit 21, the line sensor faces the reading region. Although only one surface is read in the embodiment, both surfaces may be read. When both surfaces are read, a line sensor may be provided separately from the line sensor of the flat bed scanner unit 21 so that reading of both surfaces can be completed in one transport, and the line sensor of the flat bed scanner unit 21 may read the document by reversing the document and transporting it again.

The document transported by changing an orientation thereof to the right by the transport path 22*b* is discharged to the document receiving portion 22*d* located below the document placement portion 22*a* by a first discharge roller 22*c*1 located at the end of the transport path 22*b*.

As illustrated in FIG. 3, the document receiving portion 22*d* has a first region 22*d*1 that overlaps the document placement portion 22*a*, and a second region 22*d*2 that does not overlap the document placement portion 22*a*. Since the document can only advance until the end thereof in a length direction reaches the first discharge roller 22*c*1, a document with a short sheet length is hidden by the document placement portion 22*a*. For example, in the case of an A4-sized document, when the document is discharged to the document receiving portion 22*d* by the first discharge roller 22*c*1, a leading end of the document reaches the second region 22*d*2, and thus the document is not hidden by the document receiving portion 22*d*. However, when the document is smaller than A5 size and is discharged to the document receiving portion 22*d* by the first discharge roller 22*c*1, the leading end thereof may not reach the second region 22*d*2 and may be hidden by the document receiving portion 22*d*.

Therefore, in order to prevent forgetting to pick up the document, an amount of discharge and transport of a document with a short sheet length is selectively increased, and the document is transported to a place at which it is not hidden by the document tray.

As illustrated in FIG. 3, a second discharge roller 22c2 is disposed and mounted in the first region 22d1 of the embodiment.

A document with a long sheet length is discharged using only the existing first discharge roller 22c1, and a document with a short sheet length is transported using both the first discharge roller 22c1 and the second discharge roller 22c2.

The existing first discharge roller 22c1 corresponds to a first discharge portion, and the second discharge roller corresponds to a second discharge portion located downstream in the transport direction of the document from the first discharge portion. Thus, since a position at which a transport force can be applied to the document can be located further downstream, the leading end of the document can be transported further downstream. That is, an amount of transport of the document can be increased. The document with a long sheet length corresponds to a first document, and the first document is discharged by the first discharge portion. The document with a short sheet length corresponds to a second document with a shorter length in the transport direction than the first document, and the second document is discharged by the first discharge portion and the second discharge portion. The document can be discharged to the region that does not overlap the document placement portion 22a by extending the discharge portion to the downstream side and discharging the document with the short sheet length from the discharge portion on the downstream side.

A method for determining whether the sheet length is long or short may be determined based on a length detected using an existing document length detector, or may be determined based on a length of the document that can be detected when the document is converted into electronic data. Such determination is called software determination. In the case of the software determination, when the determined document length is a so-called small-sized document, it is possible to more effectively prevent forgetting to pick up the document by generating a warning sound from a speaker or performing a display on a display provided in the recording device 10 to call attention to the forgetting of the document.

Here, the document length detector and the process of detecting the length of the document when the document is converted into electronic data correspond to a detection unit that detects the length of the document in the transport direction. The control portion 23 that processes the software determines the first document and the second document from the detection result of the detection unit. In this way, it is possible to accurately grasp the length of the document by measuring the document length directly, and a more appropriate discharge distance can be obtained.

The control portion 23 performs a step of determining whether the document is a first document or a second document with a shorter length in the transport direction than the first document, and also performs a step of discharging the document by the first discharge portion when the document is the first document, and discharging the document by the first discharge portion and the second discharge portion when the document is the second document.

As another method for determining the document length, it is possible to input the document length by a user or to determine the document length from a document width.

In addition, the speaker or the display corresponds to an information transmission unit that transmits information to the user, and the control portion 23 transmits information through the information transmission unit when the second document with a short sheet length is discharged. It is possible to prevent forgetting to pick up the document by notifying the user that a small document with a short sheet length has been discharged by the information transmission unit.

Figure 5:
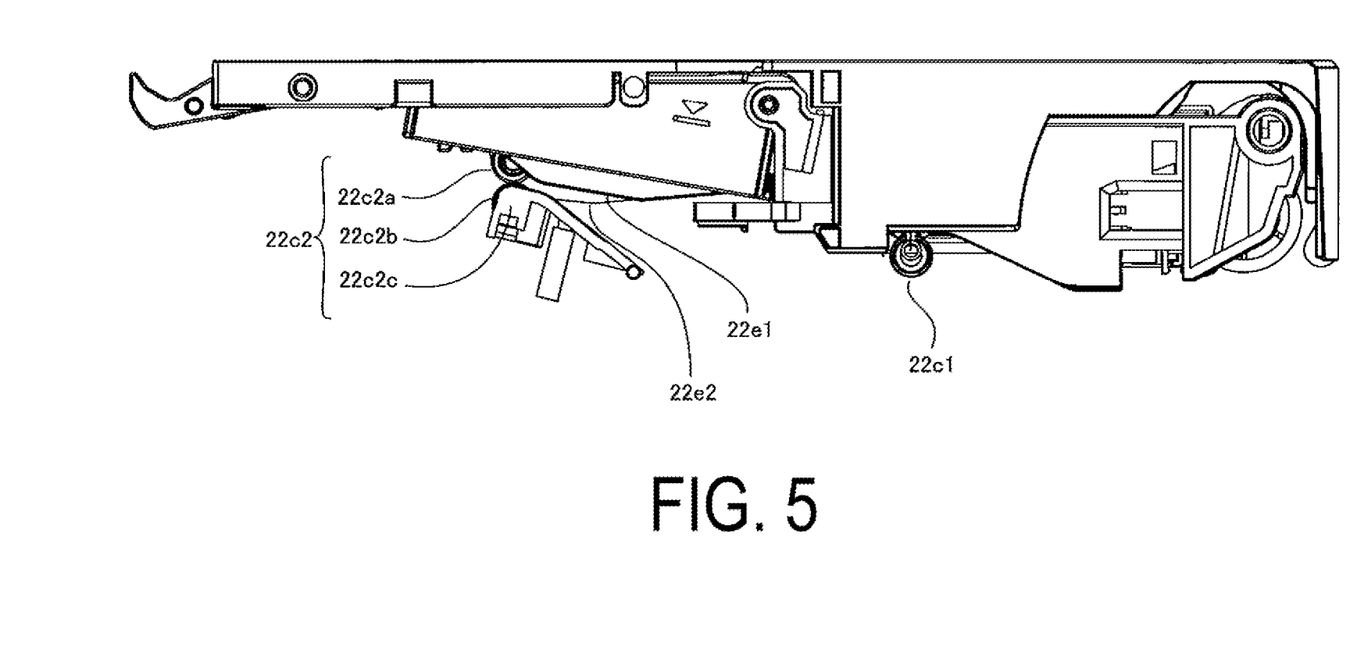
FIG. 5 is a cross-sectional view illustrating a nipped state of a second discharge portion of the recording device.
Figure 6:
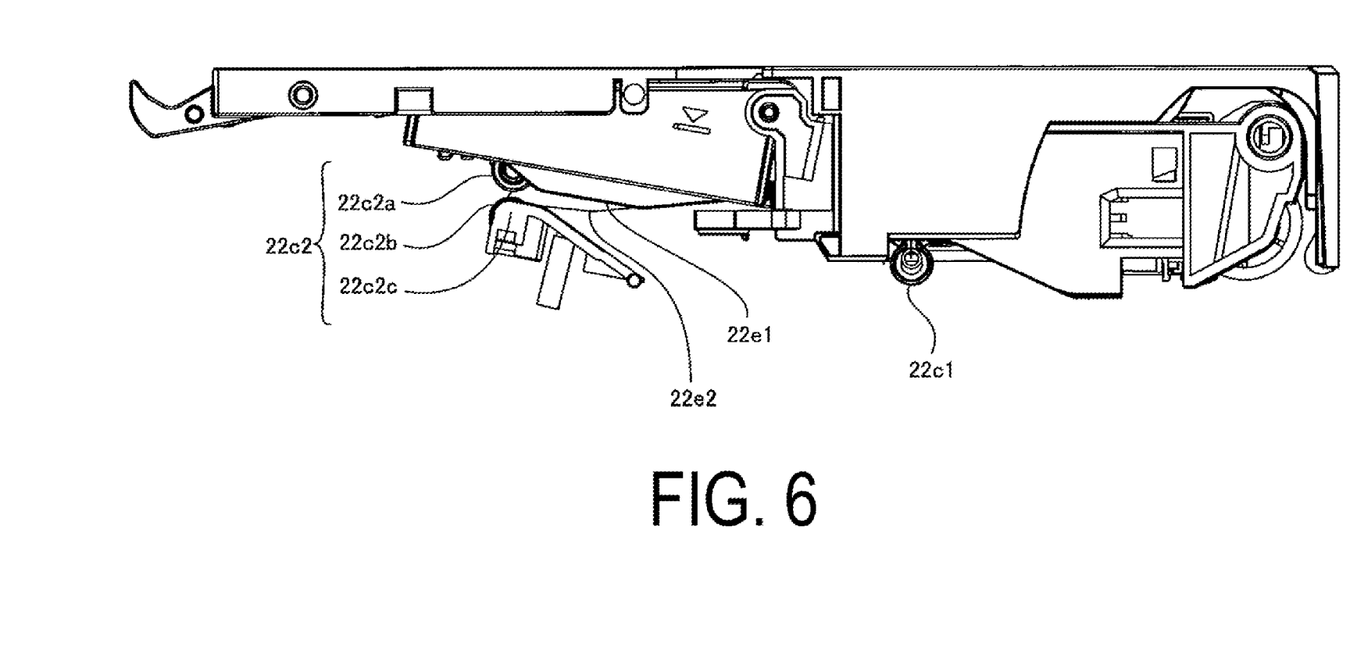
FIG. 6 is a cross-sectional view showing a non-nipped state of the second discharge portion of the recording device.

FIGS. 5 and 6 illustrate part of the automatic document feeder unit of the recording device. FIG. 5 illustrates the second discharge portion in a nipped state, and FIG. 6 illustrates the second discharge portion in a non-nipped state.

As illustrated in FIGS. 4 to 6, a plurality of first ribs 22e1 is disposed in the width direction of the document on the ceiling side of the document receiving portion 22d to reduce contact resistance when the document is discharged. As illustrated in FIG. 4, the second discharge roller 22c2 is disposed at a position at which the second discharge roller 22c2 is offset to the right side with respect to the center in the width direction of the document in FIG. 4. The document is set so that a right end of the document is in contact with a right end of the automatic document feeder unit 22, and an A4 document occupies almost the entire width of the document, but a small document such as A5 occupies only the right portion of the document width. Therefore, the second discharge roller 22c2 configured to discharge the small document is also offset to the right side than the center. That is, the second discharge roller 22c2 can be disposed in accordance with a region in which the small document is transported. In the case of a configuration in which the center is used as a reference regardless of the size of the document in the width direction, it may be provided at the center. Also, it may be provided on both sides of the center of the document in the width direction.

One second rib 22e2 having a longer protruding length than the first rib 22e1 is formed on the ceiling side of the document receiving portion 22d. The second rib 22e2 is located to the left in FIG. 4 with respect to the second discharge roller 22c2. That is, the second rib 22e2 is located outside the second discharge roller 22c2 with respect to the center in the width direction of the document. More specifically, in the case of an A4 document, it occupies almost the entire width of the document, so naturally it is guided downward by the second rib 22e2, but a small document such as A5 occupies only the right portion of the width of the document, so it does not come into contact with the second rib 22e2 and is not guided downward.

In this way, the second rib 22e2 is provided at a position at which it is in contact the first document but is not in contact with the second document, and thus the first document that is not discharged by the second discharge roller 22c2 is less likely to come into contact with the second discharge roller 22c2. Therefore, when the first document is discharged, the second discharge roller 22c2 becoming a transport load is able to be suppressed.

The second rib 22e2 may be fixed, but may be configured to be movable so as to protrude or retreat as necessary. Further, a rib 22e may be provided in the width direction, and a part or the whole of the rib 22e may be configured to protrude or retreat in accordance with the document. At this time, an amount of protrusion may be changed.

In this case, the second rib 22e 2 or the rib 22e is configured to be displaceable. The amount of protrusion and a protrusion position can be changed in accordance with the size of the document by selectively displacing the rib, and thus the document can be more effectively guided.

As illustrated in FIG. 5 and FIG. 6, the second discharge roller 22c2 includes a second discharge driving roller 22c2a on the upper side, and a second discharge driven roller 22c2b and the roller holder 22c2c on the lower side. The second discharge driving roller 22c2a on the upper side rotates by itself due to transmission of a rotational driving force, but the second discharge driven roller 22c2b on the lower side is supported by the roller holder 22c2c and rotates in contact with the second discharge driving roller 22c2a when it is pressed upward. The roller holder 22c2c is driven upward and downward in the vertical direction. When the roller holder 22c2c is operated upward, the second discharge roller 22c2 is in a nipped state, and when the roller holder 22c2c is operated downward, the second discharge roller 22c2 is in a non-nipped state (a released state). When the document is discharged in the nipped state, the document is nipped between the second discharge driving roller 22c2a and the second discharge driven roller 22c2b of the second discharge roller 22c2, and the document is driven to reach the second region. When the document is discharged in the released state, the document is not nipped between the second discharge driving roller 22c2a and the second discharge driven roller 22c2b even when the second discharge driving roller 22c2a is being rotated, and thus the document is not driven by the second discharge roller 22c2. When the first document is discharged, the release state is set, and when the second document is discharged, the nipped state is set.

The second discharge driving roller 22c2a protrudes downward further than the first rib 22e1, and the second rib 22e2 protrudes downward further than the second discharge driving roller 22c2a. In this way, the second discharge portion is a roller pair capable of switching between the nipped state and the released state, and when the first document is discharged, the second discharge portion is in the released state. That is, when a large document is discharged, the second discharge portion is released from the nipped state, thus the second discharge portion obstructing the discharge of a large document is able to be suppressed. In addition, when the second discharge portion discharges a large document, the document is discharged beyond the second region, and thus it protrudes too much. The driven roller may be separated, or the driving roller may be separated, or both may be separated in order to be in the released state.

Additionally, the transport path including the document receiving portion 22d includes a rib that guides a first surface of the document closer to the document placement portion 22a between the first discharge portion and the second discharge portion, the rib includes a first rib 22e1 and a second rib 22e2 disposed side by side in the width direction that intersects the transport direction, the roller pair includes a first roller (the second discharge driving roller 22c2a) facing the first surface of the document, and a second roller (the second discharge driven roller 22c2b) facing the surface opposite to the first surface, the first rib 22e1 has a protruding length that protrude closer to the document placement portion 22a than the first roller in the nipped state protrude, and the second rib 22e2 has a protruding length farther from the document placement portion 22a than the first roller in the nipped state. In this way, since the second rib protrudes more than the first roller in the nipped state, the first document can be prevented from coming into contact with the first roller, and a discharge distance of the small document can be extended, and the discharge of the large document cannot be prevented.

In this way, when a small-sized document hidden by the document placement portion 22a such as the document tray is discharged, in addition to the existing first discharge roller 22c1, the second discharge roller 22c2 increases the transport distance and transports the document to a position visible from the document tray. On the other hand, when a large document such as A4 is discharged, the releasing of the nipped state is switched in accordance with whether or not the document requires a long discharge length, such that the second discharge roller 22c2 does not become a transport load. Additionally, the second discharge roller 22c2 is configured to rotate together with the discharge of the document.

Since the second rib 22e2 protrudes downward further than the second discharge roller 22c2, a force in a direction away from the second discharge roller 22c2 is applied to a large document discharged while being pressed by the second rib 22e2, and the transport load due to contact with the second discharge roller 22c2 can be suppressed.

In FIG. 1, a stopper 22d3 for preventing the discharged document from protruding from the recording device 10 and falling is provided. The stopper 22d3 can be pulled out as necessary to prevent the document from falling, and when not needed, the stopper 22d3 can be accommodated without a housing to prevent it from protruding outside. The stopper 22d3 also constitutes the document receiving portion 22d. Also, the stopper 22d3 is also part of the second region.

As described above, since a small document is discharged to a position at which the document is not hidden by the document tray, when an image is read using an automatic document feeder, even a small document that are easy to forget can be discharged in a visible position, and thus the chance of forgetting to pick it up can be reduced. That is, in the document receiving portion 22d, the document is discharged to a region that does not overlap the document placement portion 22a, and thus the visibility of the document after the reading is completed is improved.

In addition, when whether or not a document has been left out is checked, there is no need to take a looking-in posture.

Furthermore, in an image reading operation using a normal automatic document feeder, it is necessary to put a hand in a recessed position to grasp a small document, and when such a method is used, it is possible to grasp a large document at a position to take it out.

In addition, even when the size of the document is mixed, since a discharge leading end is aligned with a leading end of the large document regardless of the size, the risk of dropping the document when taking it out can be reduced.

Second Embodiment

In the first embodiment, the second discharge roller 22c2 is provided in addition to the first discharge roller 22c1. In the second embodiment, the second discharge roller 22c2 is not provided, and a rotation speed of the first discharge roller 22c1 is changed.

The second embodiment changes a stack position by changing a speed of the transport roller in order to change the amount of transport in accordance with the document.

The second embodiment may be combined with the first embodiment. When the second embodiment is combined with the first embodiment, the rotation speed of the first discharge roller 22c1 may be changed, the rotation speed of the second discharge roller 22c2 may be changed, and both rotation speeds may be changed.

In the case of a large-sized document, the rotation speed of the first discharge roller 22c1 is set to a rotation speed at which the first discharge roller 22c1 is separated from the first discharge roller 22c1 and immediately stops at the document receiving portion 22d. On the other hand, in the case of a small-sized document, the rotation speed of the first discharge roller 22c1 is increased. That is, when the document is discharged by the first discharge roller 22c1, the discharge speed is sufficiently fast such that at least part of the document reaches the second region 22dd2. For example, it is rotated at such a speed that a location at which the blown-off document falls is the same as a position at which the large-sized document is discharged and stopped or a position at which the document is stopped by the stopper 22d3.

In this way, it is possible to improve the visibility of the document after reading by transporting the document after reading to a region run out from the first region 22d1 hidden by the document placement portion 22a which is the document placement tray.

Here, the discharge portion discharges the first document at a first discharge speed and discharges the second document with a shorter length in the transport direction than the first document at a second discharge speed greater than the first discharge speed. In other words, the control portion 23 performs a step of determining whether the document is the first document or the second document with a shorter length in the transport direction than the first document, and performs a step of discharging the document at the first discharge speed when the document is the first document and discharging the document at the second discharge speed that is larger than the first discharge speed when the document is the second document. In this way, since the small-sized document is discharged at a speed rate, the document can be discharged farther.

Third Embodiment

Figure 7:
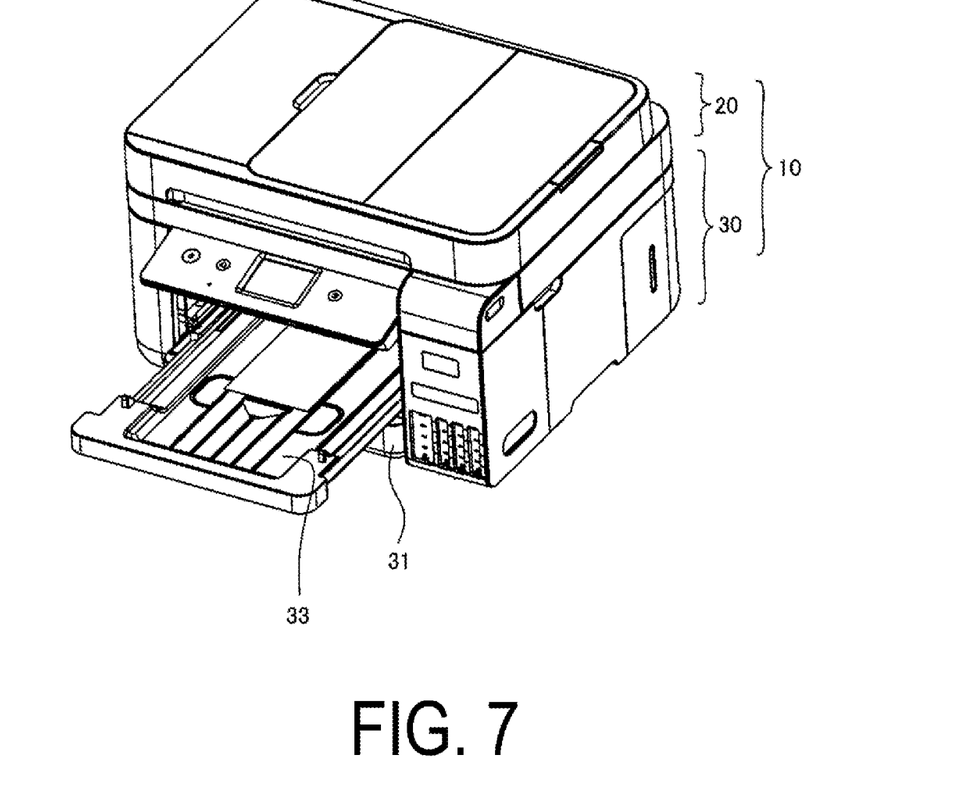
FIG. 7 is a perspective view of a recording device according to a modified example.
Figure 8:
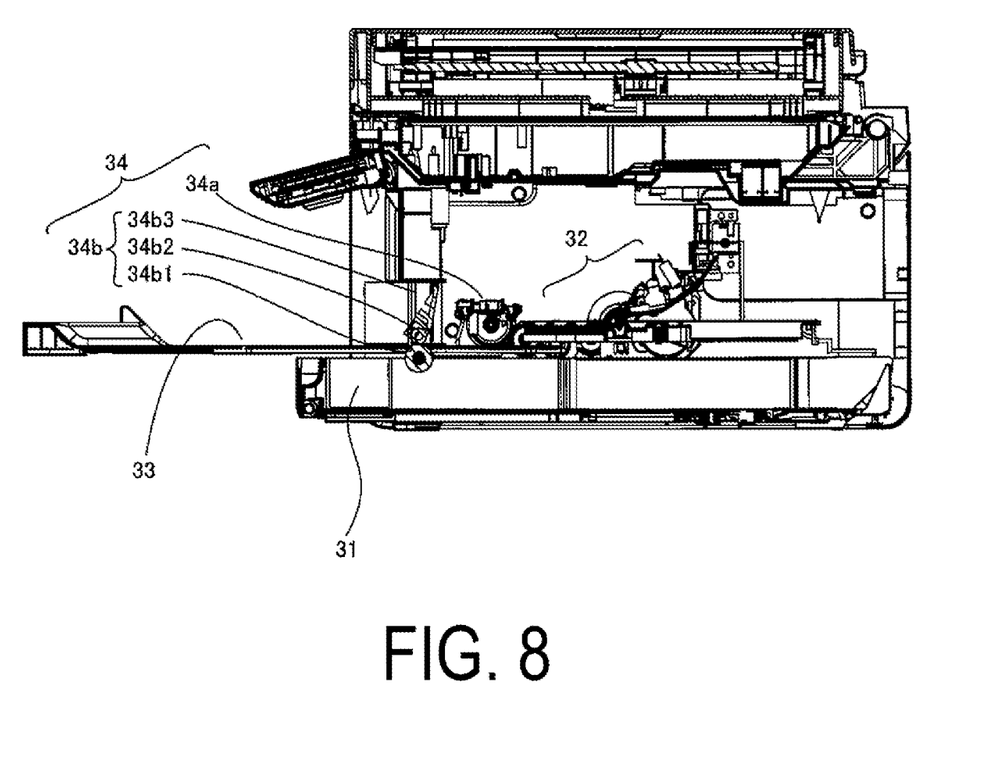
FIG. 8 is a cross-sectional view of the recording device according to the modified example.

FIG. 7 is a perspective view of a recording device according to a modified example, and FIG. 8 is a cross-sectional view.

The recording device 10 includes the image printing device 30, and the image printing device 30 includes a sheet discharge tray 33 above a sheet tray 31. The sheet accommodated in the sheet tray 31 is printed via an internal printing unit 32, and the sheet after printing is discharged onto the sheet discharge tray 33. The sheet discharge tray 33 is configured so that a leading end thereof can be pulled out of a main body, and has a size that allows the whole sheet that can be accommodated in the sheet tray 31 to be placed at a pulled-out position.

The sheet tray 31 can accommodate a large-sized sheet and can accommodate a small-sized sheet, similar to the document. The large-sized sheet is discharged to the leading end of the sheet discharge tray 33, but when the small-sized sheet, for example, an L-sized photo sheet is discharged and stopped inside the sheet discharge tray 33, the user cannot find it.

The printing unit 32 includes a transport path from the sheet tray 31 to the sheet discharge tray 33, and includes a discharge portion 34 that discharges a sheet on which printing is completed via the transport path. A portion that receives the sheet discharged by the discharge portion 34 is the sheet discharge tray 33. In such a recording device 10, it is possible to improve the visibility of the sheet on which printing is completed by applying the configuration described in the first embodiment or the second embodiment.

The discharge portion 34 includes a first discharge roller 34a that discharges a large-sized sheet. The first discharge roller 34a is disposed inside the sheet discharge tray 33, and when the large-sized sheet is discharged by the first discharge roller 34a, and a trailing end of the sheet leaves the first discharge roller 34a, the leading end of the sheet is located at the leading end of the sheet discharge tray 33.

The second discharge roller 34b is configured of a second discharge driving roller 34b1, a second discharge driven roller 34b2, and a roller holder 34b3, and is mounted in front of the first discharge roller 34a, that is, on the downstream side in a discharge path. The second discharge driven roller 34b2 is supported by the roller holder 34b3, and the roller holder 34b3 is movable upward and downward. When the roller holder 34b3 moves downward, the second discharge driven roller 34b2 is pressed against the second discharge driving roller 34b1 to be in the nipped state, and when the roller holder 34b3 moves upward, the second discharge driven roller 34b2 is in the released state in which it is separated from the second discharge driving roller 34b1.

In this way, the discharge portion includes a first discharge portion configured of the first discharge roller 34a, and a second discharge portion configured of the second discharge roller 34b located downstream in the transport direction of the sheet with respect to the first discharge portion. Then, a first sheet having a large size is discharged by the first discharge portion, and a second sheet having a shorter length in the transport direction than the first sheet is discharged by the first discharge portion and the second discharge portion. The second discharge portion is a roller pair capable of switching between the nipped state and the released state, and when the first sheet is discharged, the second discharge portion is in the released state. On the other hand, when the second sheet is discharged, the second discharge portion is in the nipped state. When the second discharge driving roller 34b1 of the second discharge portion in the nipped state rotates, the sheet is discharged by the second discharge portion. Since the second discharge portion is located downstream in the transport direction with respect to the first discharge portion, a small-sized sheet can be discharged to the leading end side of the sheet discharge tray 33. Also, when a large-sized sheet is discharged, the second discharge portion releases the nipped state, and thus it is possible to suppress the second discharge portion from hindering the discharge of the large-sized sheet. The driving roller may be separated, the driven roller may be separated, both may be separated.

Here, although the first embodiment is applied to the recording device 10 as an example, the second embodiment can also be applied. Also, both the first embodiment and the second embodiment can be applied.

The present disclosure is not limited to the embodiments described above. It will be obvious to those skilled in the art that

- mutually replaceable members, configurations, and the like disclosed in the above embodiments can be applied by appropriately changing their combinations
- although not disclosed in the embodiment, members, configurations, and the like that can be mutually replaced with the members, configurations, and the like disclosed in the above embodiments as known techniques are appropriately substituted, and also combinations thereof are changed and applied
- although not disclosed in the embodiment, those skilled in the art can appropriately substitute the members and configurations and the like that can be assumed as substitutes for the members and configurations disclosed in the above embodiments based on the known techniques and the like, and also combinations thereof are changed and applied are disclosed as embodiments of the present disclosure.

What is claimed is:

1. An image reading device comprising:
a reading portion configured to read an image of a document;
a document placement portion on which a document before reading is placed;
a discharge portion configured to discharge the document for which reading is completed by the reading portion;
a document receiving portion configured to receive the document discharged by the discharge portion;
a transport path configured to transport the document from the document placement portion to the document receiving portion via the reading portion; and
a control portion configured to control the reading portion and the discharge portion, wherein
the document receiving portion has a first region that overlaps the document placement portion when seen in a vertical direction, and a second region that does not overlap the document placement portion when seen in the vertical direction, and
the discharge portion discharges the document so that at least part of the document is placed on the second region.

2. The image reading device according to claim 1, wherein, in the document receiving portion, the first region and the second region are arranged in this order in a transport direction of the document.

3. The image reading device according to claim 1, wherein the discharge portion includes a first discharge portion and a second discharge portion located downstream in a transport direction of the document from the first discharge portion.

4. The image reading device according to claim 1, wherein the discharge portion discharges a first document at a first discharge speed and discharges a second document with a shorter length in a transport direction than the first document at a second discharge speed greater than the first discharge speed.

5. The image reading device according to claim 3, wherein
a first document is discharged by the first discharge portion, and
a second document with a shorter length in the transport direction than the first document is discharged by the first discharge portion and the second discharge portion.

6. The image reading device according to claim 5, wherein
the second discharge portion is a roller pair configured to switch between a nipped state and a released state, and
when the first document is discharged, the second discharge portion is in the released state.

7. The image reading device according to claim 6, wherein
the transport path includes a rib configured to guide, between the first discharge portion and the second discharge portion, a first surface of the document that is a surface close to the document placement portion,
the rib includes a first rib and a second rib disposed in a width direction intersecting the transport direction,
the roller pair includes a first roller facing the first surface of the document and a second roller facing a surface opposite to the first surface,
the first rib has a protruding length that protrude toward the document placement portion as compared with the first roller in the nipped state, and
the second rib has a protruding length that is farther from the document placement portion than the first roller in the nipped state.

8. The image reading device according to claim 6, wherein
the transport path includes a rib configured to guide, between the first discharge portion and the second discharge portion, a first surface of the document closer to the document placement portion, and
the rib is displaceable between a protruding length that protrude toward the document placement portion as compared with the first roller in the nipped state and a protruding length that is farther from the document placement portion than the first roller in the nipped state.

9. The image reading device according to claim 4, further comprising
a detection unit configured to detect a length of the document in the transport direction, wherein
the control portion distinguishes the first document and the second document based on a detection result of the detection unit.

10. The image reading device according to claim 4, further comprising an information transmission unit configured to transmit information to a user, wherein
the control portion transmits information by the information transmission unit when the second document is discharged.

11. A recording device comprising:
the image reading device according to claim 1; and
a recording unit provided below the image reading device and configured to perform recording on a medium.

12. The image reading device according to claim 5, further comprising
a detection unit configured to detect a length of the document in the transport direction, wherein
the control portion distinguishes the first document and the second document based on a detection result of the detection unit.

13. The image reading device according to claim 5, further comprising an information transmission unit configured to transmit information to a user, wherein
the control portion transmits information by the information transmission unit when the second document is discharged.

14. A control method for an image reading device which comprises:
a reading portion configured to read an image of a document;
a document placement portion on which a document is placed;
a discharge portion configured to discharge the document for which reading is completed by the reading portion; and
a document receiving portion configured to receive the document discharged by the discharge portion,
the document receiving portion having a first region that overlaps the document placement portion when seen in a vertical direction, and a second region that does not overlap the document placement portion when seen in the vertical direction, the method comprising:
changing an amount of discharge of the document by the discharge portion according to a length of the document in a transport direction of the document such that at least part of the document is placed on the second region.

15. The control method for an image reading device according to claim 14, further comprising:
- determining whether the document is a first document or a second document with a shorter length in the transport direction than the first document,
- discharging the document by the first discharge portion when the document is the first document, and
- discharging the document by the first discharge portion and the second discharge portion when the document is the second document.

16. The control method for an image reading device according to claim 14, further comprising:
- determining whether the document is a first document or a second document with a shorter length in the transport direction than the first document,
- discharging the document at a first discharge speed when the document is the first document, and
- discharging the document at a second discharge speed greater than the first discharge speed when the document is the second document.

* * * * *